United States Patent
Prince et al.

(10) Patent No.: US 12,519,116 B2
(45) Date of Patent: Jan. 6, 2026

(54) SYSTEM FOR COOLING A FUEL CELL AND FUEL CELL EQUIPPED WITH SUCH A SYSTEM

(71) Applicant: LIEBHERR-AEROSPACE TOULOUSE SAS, Toulouse (FR)

(72) Inventors: Karine Prince, Toulouse (FR); David Lavergne, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 557 days.

(21) Appl. No.: 17/926,620

(22) PCT Filed: Jun. 10, 2021

(86) PCT No.: PCT/EP2021/065719
§ 371 (c)(1),
(2) Date: Nov. 20, 2022

(87) PCT Pub. No.: WO2021/250213
PCT Pub. Date: Dec. 16, 2021

(65) Prior Publication Data
US 2023/0187662 A1    Jun. 15, 2023

(30) Foreign Application Priority Data

Jun. 11, 2020 (FR) ...................... 2006105

(51) Int. Cl.
*H01M 8/04* (2016.01)
*B64D 13/06* (2006.01)
(Continued)

(52) U.S. Cl.
CPC ........ *H01M 8/04074* (2013.01); *B64D 13/06* (2013.01); *H01M 8/04164* (2013.01);
(Continued)

(58) Field of Classification Search
CPC ......... H01M 8/04074; H01M 8/04164; H01M 8/04358; H01M 8/04992; B64D 13/06
(Continued)

(56) References Cited

U.S. PATENT DOCUMENTS

2006/0240308 A1* 10/2006 Formanski .......... H01M 8/0265
429/514
2007/0160881 A1* 7/2007 Ukai ................. H01M 8/04141
429/429
(Continued)

FOREIGN PATENT DOCUMENTS

JP          2002343396      11/2002
WO    WO-2019054072 A1     3/2019

*Primary Examiner* — James M Erwin
(74) *Attorney, Agent, or Firm* — CRGO Global; Steven M. Greenberg

(57) ABSTRACT

The invention relates to a system for cooling a fuel cell (10) of a transport vehicle such as an aircraft, comprising: a cooling heat exchanger (30) configured to be able to exchange heat between a loop (20) for cooling the cell and a channel for circulating dynamic air; a device (22, 23) for recovering water produced by said fuel cell; a tank (25) for storing recovered water; a device (50) for spraying water into said dynamic air channel (40) upstream of said heat exchanger (30); and a computer (28) for controlling the amount of sprayed water on the basis of a measurement representing the temperature of said fuel cell (10).

13 Claims, 1 Drawing Sheet

(51) Int. Cl.
　　　*H01M 8/04007*　　(2016.01)
　　　*H01M 8/04119*　　(2016.01)
　　　*H01M 8/0432*　　(2016.01)
　　　*H01M 8/04992*　　(2016.01)

(52) U.S. Cl.
　　　CPC ... *H01M 8/04358* (2013.01); *H01M 8/04992* (2013.01); *B64D 2013/0659* (2013.01); *H01M 2250/20* (2013.01)

(58) Field of Classification Search
　　　USPC .......................................................... 429/434
　　　See application file for complete search history.

(56) References Cited

U.S. PATENT DOCUMENTS

| | | | |
|---|---|---|---|
| 2015/0221964 A1* | 8/2015 | Fellows | H01M 8/04029 429/429 |
| 2016/0036071 A1 | 2/2016 | Klewer | |
| 2017/0018787 A1 | 1/2017 | Sanderson | |
| 2021/0245629 A1* | 8/2021 | Klimpel | H01M 8/0432 |
| 2022/0009379 A1* | 1/2022 | Mikic | B60L 58/33 |

\* cited by examiner

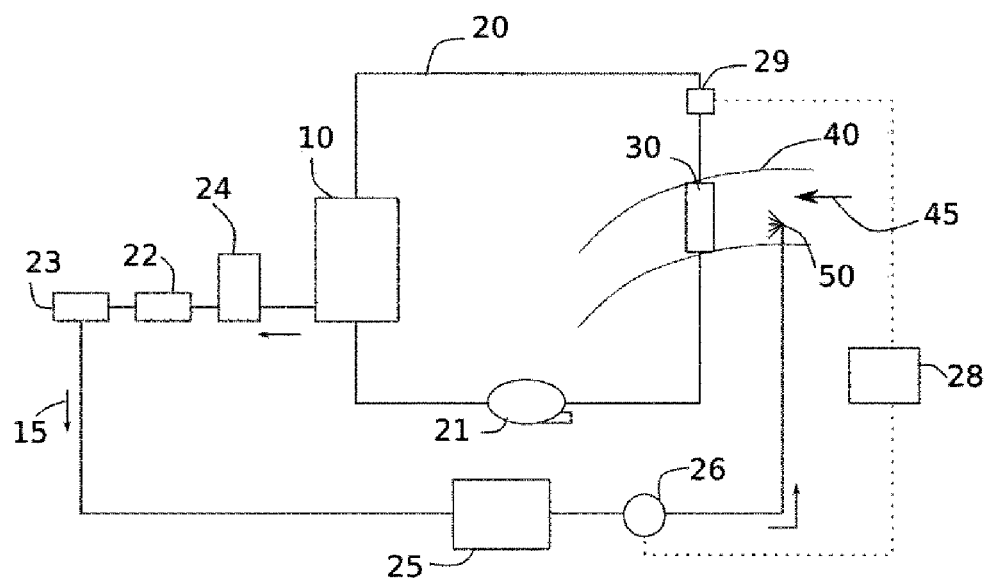

SYSTEM FOR COOLING A FUEL CELL AND FUEL CELL EQUIPPED WITH SUCH A SYSTEM

CROSS-REFERENCE TO RELATED APPLICATIONS

This application is a § 371 national phase entry of International Application No. PCT/EP2021/065719, filed Jun. 10, 2021, which claims priority to French Patent Application No. 2006105 filed on Jun. 11, 2020.

TECHNICAL FIELD OF THE INVENTION

The invention relates to a system for cooling a fuel cell that is intended to be provided in a transport vehicle, in particular an airborne transport vehicle such as an aircraft. The invention also relates to a fuel cell or a set of fuel cells equipped with such a cooling system.

TECHNOLOGICAL BACKGROUND

Today, there is a strong enthusiasm for providing transport vehicles, in particular aircraft, which are equipped with fuel cells, because these cells form clean, reliable and flexible energy sources.

The principle that underlies a fuel cell such as a hydrogen cell is based on the separation of water, under the effect of an electric current (electrolysis), into dihydrogen and dioxygen. These two molecules form the chemical fuel under which energy can be stored within a fuel cell application. A second reaction provided by the fuel cell as such makes it possible to reverse the process and produce electricity from these two fuels.

In aeronautical applications, the electrolysis reaction described is generally performed on the ground, so that the hydrogen is directly loaded into a dedicated tank and the dioxygen is provided by the air drawn from outside the aircraft.

The fuel cell as such is therefore a two-electrode electrical generator that produces electrical energy via the oxidation, on one electrode, of a reductive fuel such as hydrogen, coupled with the reduction, on the other electrode, of an oxidant such as oxygen in the air, for example.

The oxidation-reduction reaction of the cell not only generates electricity, but also by-products such as water, heat and oxygen-depleted air.

In particular, the oxidation reaction at the anode breaks down the hydrogen molecules in contact with a catalyst in order to free the electrons and release heat. The reduction reaction at the cathode forms oxygen ions by means of the contact between the oxygen and the electrons freed by the oxidation. Moreover, the hydrogen protons recombine with the oxygen ions in order to form water.

It is therefore necessary to provide a system for cooling the fuel cell in order to dissipate the heat released by the cell.

In particular, for every 1 kW of electricity produced, a fuel cell emits 1 kW of heat.

One of the solutions currently used in the aeronautical field to dissipate this heat is that of providing a cooling system supplied with outside air, the flow rate of which is designed for the full power of the cell for maximum observed external temperatures.

One of the disadvantages of this solution is that it requires a very high air flow rate. By way of example, it is estimated that, for a generated power of around 100 kW, the air flow rate required to ensure cooling of the cell is in the range of 1.5 to 2 kg/s. This high air flow rate results in significant drag on the aircraft and creates the need for a heat exchanger having a large front surface, the consequence of which is large dimensions and mass.

These disadvantages are particularly detrimental for low-temperature fuel cells, for which the temperature difference between the cell and the cold cooling source is only about ten degrees.

The inventors have therefore sought to develop an optimized cooling system that in particular makes it possible to adapt the cooling power to the flight conditions of the aircraft.

AIMS OF THE INVENTION

The invention aims to provide a system for cooling a fuel cell that overcomes at least some of the disadvantages of the known cooling systems, in particular for on-board aeronautical applications.

The invention also aims to provide, in at least one embodiment, a cooling system which has limited overall dimensions by comparison with the known systems.

The invention aims in particular to provide, in at least one embodiment, a cooling system which makes it possible to divide, by three, the size of the cooling heat exchanger required to discharge a power given by a known system.

The invention also aims to provide, in at least one embodiment of the invention, a system which makes it possible to boost cooling in hot weather.

The invention also aims to provide a fuel cell equipped with a cooling system according to the invention.

DISCLOSURE OF THE INVENTION

In order to achieve these aims, the invention relates to a system for cooling a fuel cell of a transport vehicle such as an aircraft, which fuel cell comprises an anode and a cathode, said system comprising a loop for cooling the cell that is in thermal interaction with said anode and/or said cathode.

The cooling system according to the invention is characterized in that it also comprises:
- a cooling heat exchanger configured to be able to exchange heat between said cooling loop and a channel for circulating cooling air drawn from outside the transport vehicle, which channel is referred to as the dynamic air channel,
- a device for recovering water produced by said fuel cell,
- a tank for storing water, which tank is fluidically connected to said water recovery device in order to be able to store said recovered water therein,
- a device for spraying water into said dynamic air channel upstream of said heat exchanger, said spraying device being fluidically connected to said water tank,
- a computer for controlling the amount of water sprayed by said water spraying device into said dynamic air channel on the basis of a measurement representing the temperature of said fuel cell.

The system according to the present invention therefore has the specific feature of making it possible to recover the water produced by the fuel cell during its operation (in particular the water at the cathode outlet) and to use this water to cool the cooling air flow drawn from outside the vehicle by spraying it upstream of the cooling exchanger of the cell, which therefore makes it possible to cool the coolant fluid of the cooling loop of the cell that is in thermal interaction with the anode and/or the cathode of the cell.

This injection of liquid water in the form of droplets into the dynamic air channel, upstream of the cooling heat exchanger, lowers the temperature of the air entering the cold pass of the cooling exchanger (the cold pass of the exchanger is formed by said dynamic air drawn from outside the vehicle and the hot pass of the exchanger is formed by the fluid of the cooling loop of the cell). This water, as it evaporates, absorbs heat and therefore allows the temperature of the air to be lowered.

Moreover, if a large amount of water is injected, part of the water is evaporated upstream of the exchanger and another part is evaporated inside the exchanger on the walls of the exchanger. The evaporation of the water inside the exchanger aims to take advantage of the latent heat of evaporation of the water. It also aims to improve the exchange coefficient inside the exchanger.

The invention therefore makes the water produced by the fuel cell (which is generally lost) functional in order to optimize the cooling of the fuel cell.

Moreover, with the cooling air flow cooled by said spraying of water, the air flow rate required to ensure the cooling of the coolant fluid of the cooling loop can be substantially reduced by comparison with the systems known from the prior art.

This reduction in the air flow rate therefore makes it possible to reduce the drag on the vehicle, which is particularly sought after in the context of an on-board aeronautical application.

The dimensions and the footprint of the cooling heat exchanger can thus also be reduced.

The system according to the invention also makes it possible to boost cooling in hot weather, i.e. when the air drawn from outside the vehicle is not sufficiently cool to ensure the cooling of the fuel cell.

A further advantage of the invention is that of being able to control the amount of water evaporated upstream of the cooling heat exchanger, so as to regulate the cooling of the cell.

In order to achieve this, the system has a computer for controlling the amount of sprayed water on the basis of a measurement representing the temperature of the cell (for example a measurement of the temperature of the coolant fluid of the cooling loop).

Advantageously and according to the invention, the water recovery device comprises a water condensation device and a water extraction device which are arranged in series.

The condensation device condenses the water present in the cathode product fluid. This condensation device can, for example, be a reverse osmosis condenser or extractor exchanger. A reverse osmosis extractor minimizes the energy requirement in order to ensure the water condensation.

The water extraction device extracts the water droplets from the condensed fluid. This extraction can be extraction by means of a membrane filter, by vortex, or by means of any equivalent means.

Advantageously and according to the invention, the system also comprises a control valve fluidically arranged between said water storage tank and said spraying device, said control valve being operated by said control computer.

This control valve is controlled by the computer in order to regulate the amount of water supplying the spraying device and therefore the amount of water sprayed into the dynamic air channel upstream of the cooling heat exchanger, on the basis of the measurement representing the temperature of the fuel cell.

Advantageously and according to the invention, the system also comprises a drainage valve fluidically arranged between said water storage tank and a drainage circuit, said drainage valve being operated by said control computer.

This drainage valve, if necessary, discharges the water stored in the storage tank.

Advantageously and according to this variant, said control valve and said drainage valve are formed by a single 3-way control and drainage valve controlled by said computer.

This embodiment variant is advantageous in that it has a simplified architecture with just a single valve controlled by the computer, in order to ensure both the function of regulating the water sprayed upstream of the exchanger and the function of draining the system.

Advantageously and according to the invention, said spraying device comprises a plurality of injectors that open into said dynamic air channel.

This particular structure of the spraying device makes it possible to spray a plurality of water droplets into the cooling air flow, for example up to moisture saturation.

Advantageously and according to the invention, said injectors are configured to spray water droplets having a maximum diameter of 10 microns, so as to spray a mist formed by a mixture of water and air.

Advantageously and according to the invention, said water storage tank is also configured to be supplied, on the ground, with water provided by an external water distribution device.

According to this advantageous variant, the water tank can be supplied with water on the ground by means of an external device, which makes it possible to have a sufficient level of water in the storage tank, thus allowing the cell to be cooled in extreme conditions for which the amount of water produced by the fuel cell and recovered by the water recovery device would not be sufficient. This aspect is particularly important on the ground where the external temperatures are greater than during flight, and during take-off when the ram air flow rate is low.

Advantageously and according to the invention, the system also comprises a sensor for sensing the temperature of the coolant fluid, which sensor is configured to provide said control temperature measurement for said computer.

According to this variant, it is a direct measurement of the temperature of the coolant fluid that is used to control the regulation of the water evaporated in the dynamic air channel.

Advantageously and according to the invention, said loop for cooling said cell is formed by a cathode recirculation circuit of the cell that connects a cathode outlet of the cell intended to provide a cathode product fluid to a cathode inlet intended to be supplied with an oxidizing fluid, and said water recovery device is arranged on said cathode recirculation circuit in order to recover the water present in said cathode product fluid.

According to this advantageous variant, the cooling heat exchanger is arranged directly on the cathode recirculation circuit which therefore acts as a loop for cooling the fuel cell. In other words, it is directly the cathode product fluid intended to be reintroduced into the cell by the cathode recirculation circuit that is cooled by the cooling heat exchanger.

In this case, the water recovery device is arranged directly on the cathode recirculation circuit in order to recover the water present in said cathode product fluid.

The rest of the architecture does not change and each element of the system continues to play the same role as in the case where the cooling loop is separate from the cathode recirculation circuit.

Advantageously and according to the invention, the computer is configured to control the spraying of 30 to 40 g of water per kg of air circulating in the dynamic air channel.

This makes it possible to triple the power exchanged at the cooling exchanger of the fuel cell system.

The invention also relates to a fuel cell of an aircraft, comprising an anode equipped with an anode inlet intended to be supplied with a combustible fluid and an anode outlet intended to provide an anode product fluid, and a cathode equipped with a cathode inlet intended to be supplied with an oxidizing fluid and a cathode outlet intended to provide a cathode product fluid, characterized in that the fuel cell also comprises a cooling system according to the invention.

The advantages and technical effects of the cooling system according to the invention also apply, mutatis mutandis, to a fuel cell according to the invention.

The invention also relates to a system of fuel cells connected in series (same current provided by the different cells) or in parallel (same voltage provided by the different cells) or a combination of cells connected in series and in parallel.

The invention can be used for main electrical generation (peak power in propulsion, for example) or for additional power generation (supply of services in hot conditions, for example) or for a propulsion application as such.

The invention also relates to a transport vehicle such as an aircraft, for example, comprising a fuel cell or a set of fuel cells according to the invention.

The advantages and technical effects of a fuel cell according to the invention also apply, mutatis mutandis, to an aircraft according to the invention.

The invention also relates to a system for cooling a fuel cell that is characterized in combination by all or some of the features mentioned above or below.

LIST OF FIGURES

Further aims, features and advantages of the invention will become apparent upon reading the following description, which is provided solely by way of non-limiting example and which refers to the accompanying drawing, in which:

FIG. 1 is a schematic view of a system for cooling a fuel cell in accordance with one embodiment of the invention.

DETAILED DESCRIPTION OF ONE EMBODIMENT OF THE INVENTION

For the sake of illustration and clarity, scales and proportions are not strictly adhered to in the FIGURE.

FIG. 1 is a schematic view of a system for cooling a fuel cell 10 in accordance with one embodiment of the invention.

In FIG. 1, only the elements of the fuel cell 10 that relate to the cooling system according to the invention are shown. In particular, the means for supplying the cell with hydrogen and oxygen are not shown.

It should be noted that the fuel cell 10 may denote a single cell as such or a plurality of cells which are connected and arranged in series and/or in parallel. In other words, the use of the term "the cell" or "a cell" does not limit the scope to a single cell as such, but may cover a set of cells.

The system for cooling the fuel cell 10 comprises a loop 20 for cooling the cell that is in thermal interaction with the anode and/or the cathode of the cell in order to ensure its cooling.

This thermal interaction may be achieved by a heat exchanger, heat dissipation plates that are attached to the anode and/or the cathode, such as bipolar plates, or any equivalent means.

According to a variant embodiment, the cooling loop is directly formed by the cathode recirculation circuit which connects the cathode outlet that provides a cathode product fluid (in practice air) and the cathode inlet which is supplied with an oxidizing fluid such as compressed air.

In the event that the cooling loop is separate from the cathode recirculation circuit, the cooling loop 20 is supplied with a coolant fluid which can be a liquid or gaseous fluid. In the event that the cooling loop is formed by the cathode recirculation circuit, the cathode product fluid forms the coolant fluid within the meaning of the invention.

The loop 20 is also provided with a pump 21 which is configured to circulate the coolant fluid in the loop 20.

The cooling system according to the invention also comprises a cooling heat exchanger 30 which is arranged on the loop 20 and configured to be able to exchange heat between the coolant fluid circulating in the cooling loop 30 and cooling air circulating in an air circulation channel 40. This air circulation channel 40 is, for example, and in the case of an on-board aeronautical application, the dynamic air circulation channel better known as the ram air channel. This channel 40 is configured to be able to be supplied with air drawn from outside the aircraft at ambient temperature. The cooling air flow circulating in the dynamic air channel 40 is shown schematically by the arrow 45 in FIG. 1.

The circulation of air in the dynamic air channel 40 is ensured by a fan (not shown in the FIGURE). This fan can be an electric fan or a fan supported by a turbomachine shaft of the aircraft, for example a turbomachine of an air conditioning system.

The heat exchanger 30 can be of any known type. For example, it can be a fin-tube heat exchanger or any equivalent means.

The cooling system in accordance with the embodiment in FIG. 1 also comprises a circuit for recovering the water produced by the fuel cell.

This water recovery circuit comprises, according to the embodiment shown in FIG. 1, a water condensation device 22, a water extraction (or separation) device 23, and a humidifier 24, which are configured to extract the water from the cathode product fluid flow, which is generally air that is depleted in oxygen following the reduction reaction at the cathode of the fuel cell.

According to one possible embodiment, the condensation device 22 is a reverse osmosis condenser or extractor exchanger. A reverse osmosis extractor minimizes the energy requirement in order to ensure the water condensation. The water separator 23 is a membrane filter or a vortex system, for example. The humidifier 24 aims to humidify the cathode product air before it is condensed by the water condensation device 22.

The water recovering system also comprises a water storage tank 25 supplied by the water separator 23. This storage tank stores the water which is produced by the fuel cell and recovered by the water recovery device of the invention.

The circulation of water in the water recovery circuit is shown schematically by the arrow 15 in FIG. 1.

According to one variant, the tank may also be supplied by an external water source (for example when the aircraft is grounded) through a duct (not shown in FIG. 1). This makes it possible to ensure a sufficient level of water in the tank, in particular in order to ensure sufficient cooling in the event of high temperatures. Indeed, in this case, a significant evaporation of water in the cooling air flow upstream of the cooling exchanger 30 is required to lower the temperature of the air to a maximum, thus ensuring the cooling of the coolant fluid circulating in the cooling loop 20.

In order to achieve this, the recovery system comprises a device 50 for spraying water into the dynamic air channel 40 upstream of the heat exchanger 30. This spraying device 50 is supplied by the water storage tank 25. As stated above, this stored water originates either from the fuel cell as such or from an external water source or from a combination of these two water sources.

The spraying device 50 can be of any known type. For example, it can be formed by a row of water injectors which open into the dynamic air channel 40. Each injector is supplied by a dedicated duct which branches off from a main duct fluidically connected to the water tank 25. Each injector is configured to spray water droplets, for example of around 10 microns in diameter, so as to be able to obtain a mist (mixture of water and air) upstream of the exchanger or directly in the exchanger. At altitude, water can also be injected directly into the exchanger.

Finally, the recovery system comprises a computer 28 configured to control the amount of water sprayed into the dynamic air channel 40 by the water spraying device 50.

In order to achieve this, the computer controls a valve 26 arranged between the water storage tank 25 and the spraying device 50 on the basis of a temperature measurement taken by a sensor 29 arranged on the cooling loop 20.

According to another embodiment, the temperature measurement can be taken elsewhere than on the cooling loop, for example directly on the fuel cell.

The valve 26, the sensor 29 and the computer 29 form the means for regulating the cooling of the fuel cell 10. The level of cooling is regulated by the amount of water sprayed into the dynamic air channel 40 upstream of the exchanger.

The computer 28 can be of any type. It can be a computer which controls the operation of the fuel cell or an independent computer dedicated solely to cooling the cell.

The dotted lines in FIG. 1 schematically represent the measurement and control signals exchanged between the computer 28, the sensor 29 and the valve 26. These signals can be exchanged by any type of known means. The control can be electrical, pneumatic or hydraulic control or a combination thereof.

According to one embodiment which is not shown in FIG. 1, the valve 26 is a three-way valve, one channel of which also supplies a drainage duct of the tank 25.

The invention also relates to a transport vehicle, in particular a railway, motor or airborne vehicle, equipped with a fuel cell or a set of fuel cells according to the invention.

A system according to the invention and a cell equipped with a system according to the invention therefore make it possible to optimize the ram air flow rate as necessary in order to ensure the cooling of the cell in different operating conditions.

The system also makes it possible to boost cooling in the event of high temperatures.

A system according to the invention is not limited to only the embodiment described and only the aeronautical application described. In particular, the invention can be applied to any type of vehicle, in particular an airborne, railway or motor vehicle, and to any type of application (main energy generation, additional energy generation or propulsion energy generation).

The invention claimed is:

1. A system for cooling a fuel cell of a transport vehicle, which fuel cell comprises an anode and a cathode, said system comprising a cooling loop of the cell that is in thermal interaction with said anode and/or said cathode, the system comprising:
a cooling heat exchanger configured to be able to exchange heat between said cooling loop and a dynamic air channel circulating cooling air drawn from outside the transport vehicle,
a water recovering device of recovering water produced by said fuel cell,
a water tank for storing water, which water tank is fluidically connected to said water recovering device in order to be able to store said recovered water therein,
a water spraying device spraying water into said dynamic air channel upstream of said cooling heat exchanger, said spraying device being fluidically connected to said water tank,
a computer for controlling the amount of water sprayed by said water spraying device into said dynamic air channel on the basis of a measurement representing a temperature of said fuel cell.

2. The system according to claim 1, wherein said water recovering device comprises a water condensation device and a water extraction device which are arranged at a cathode outlet of said fuel cell.

3. The system according to claim 1, wherein it also comprises a control valve fluidically arranged between said water storage tank and said spraying device, said control valve being operated by said computer.

4. The system according to claim 1, wherein it also comprises a drainage valve fluidically arranged between said water tank and a drainage circuit, said drainage valve being operated by said computer.

5. The system according to claim 3, wherein said control valve and said drainage valve are formed by a single 3-way control and drainage valve controlled by said computer.

6. The system according to claim 1, wherein said water spraying device comprises a plurality of injectors that open into said dynamic air channel.

7. The system according to claim 6, wherein said injectors are configured to spray water droplets having a maximum diameter of 10 microns, so as to spray a mist formed by a mixture of water and air.

8. The system according to claim 1, wherein said water tank is also configured to be supplied, on the ground, with water provided by an external water distribution device.

9. The system according to claim 1, wherein it also comprises a sensor for sensing the temperature of a heat transfer fluid circulating in said cooling loop, which sensor is configured to provide control measurement for said computer.

10. The system according to claim 1, wherein said cooling loop is formed by a cathode recirculation circuit of the fuel cell that connects a cathode outlet of the fuel cell intended to provide a cathode product fluid to a cathode inlet intended to be supplied with an oxidizing fluid, and in that said water recovering device is arranged on said cathode recirculation circuit in order to recover the water present in said cathode product fluid.

11. The system according to claim 1, wherein the computer is configured to control the spraying of 30 to 40 g of water per kg of air circulating in the dynamic air channel.

12. A fuel cell of a transport vehicle, comprising an anode equipped with an anode inlet intended to be supplied with a combustible fluid and an anode outlet intended to provide an anode product fluid, and a cathode equipped with a cathode inlet intended to be supplied with an oxidizing fluid and a cathode outlet intended to provide a cathode product fluid, wherein the fuel cell also comprises a cooling system comprising:
- a cooling heat exchanger configured to be able to exchange heat between a cooling loop and a dynamic air channel for circulating cooling air drawn from outside the transport vehicle,
- a water recovering device recovering water produced by said fuel cell,
- a water tank for storing water, which water tank is fluidically connected to said water recovering device in order to be able to store said recovered water therein,
- a water spraying device spraying water into said dynamic air channel upstream of said cooling heat exchanger, said water spraying device being fluidically connected to said water tank,
- a computer for controlling the amount of water sprayed by said water spraying device into said dynamic air channel on the basis of a measurement representing a temperature of said fuel cell.

13. A transport vehicle comprising a fuel cell comprising an anode equipped with an anode inlet intended to be supplied with a combustible fluid and an anode outlet intended to provide an anode product fluid, and a cathode equipped with a cathode inlet intended to be supplied with an oxidizing fluid and a cathode outlet intended to provide a cathode product fluid, wherein the fuel cell also comprises a cooling system comprising:
- a cooling heat exchanger configured to be able to exchange heat between a cooling loop and a dynamic air channel for circulating cooling air drawn from outside the transport vehicle,
- a water recovering device recovering water produced by said fuel cell,
- a water tank for storing water, which water tank is fluidically connected to said water recovering device in order to be able to store said recovered water therein,
- a water spraying device spraying water into said dynamic air channel upstream of said cooling heat exchanger, said water spraying device being fluidically connected to said water tank,
- a computer for controlling the amount of water sprayed by said water spraying device into said dynamic air channel on the basis of a measurement representing a temperature of said fuel cell.

* * * * *